United States Patent
Bray et al.

(10) Patent No.: US 6,245,305 B1
(45) Date of Patent: Jun. 12, 2001

(54) METHOD OF SEPARATING AND PURIFYING GADOLINIUM-153

(75) Inventors: Lane A. Bray, Richland, WA (US); Todd M. Corneillie, Davis, CA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/192,071

(22) Filed: Nov. 10, 1998

(51) Int. Cl.[7] .................................................. C01F 17/00
(52) U.S. Cl. .............................................. 423/2; 423/21.1
(58) Field of Search .................................. 423/2, DIG. 7, 423/21.1, 21.5

(56) References Cited

U.S. PATENT DOCUMENTS 5,049,284 * 9/1991 Motoki et al. ............................ 423/2

OTHER PUBLICATIONS

The Separation of Europium From Other Rare Earths, HN McCoy, J. Am Che Soc, 57, (1935) p. 1756.
Inorganic SynthesEs, vol. II, pp. 70–73, 1946, D Yost, RM Cooley.
Preparation of High–Purity Europium Oxide Using Combined Reduction–Ion Exchange Method, M. Elbanowski, J Baranowska, Journal of the Less–Common Metals, 112 (1985) 267–270.
The Application of Electroreduction of Europium in the Production of Gadolinium–153, TC Quinby, DW Ramey, M Petek, Oakridge National Laboratory, ORNL/TM–10284, Jan. 1987.
Analytical Chemistry of the Yttrium and the Lanthanide Elements, DI Ryabchikov and VA Ryabukhin, 1970.
Rare–Earth Metal Amalgams Part IV The Isolation of Europium, JK Marsh, J. Chem. Soc., No. 142, 1943.
Production and Purification of Gadlolinium–153 at Hanford, EJ Wheelwright, Nov. 1996, Presented at the Osteoporosis Seminar, Seattle, Washington, Oct. 27, 1986.
Derwent Abstract of RU 2068810, Nov. 1996.*

* cited by examiner

Primary Examiner—Steven Bos
(74) Attorney, Agent, or Firm—Paul W. Zimmerman

(57) ABSTRACT

The present invention is an improvement to the method of separating and purifying gadolinium from a mixture of gadolinium and europium having the steps of (a) dissolving the mixture in an acid; (b) reducing europium+3 to europium+2; and (c) precipitating the europium+2 with a sulfate ion in a superstoichiometric amount; wherein the improvement is achieved by using one or more of the following: (i) the acid is an anoic acid; (ii) the reducing is with zinc metal in the absence of a second metal or with an amount of the second metal that is ineffective in the reducing; (iii) adding a group IIA element after step (c) for precipitating the excess sulfate prior to repeating step (c); (iv) the sulfate is a sulfate salt with a monovalent cation; (v) adding cold europium+3 prior to repeating step (c).

23 Claims, 1 Drawing Sheet

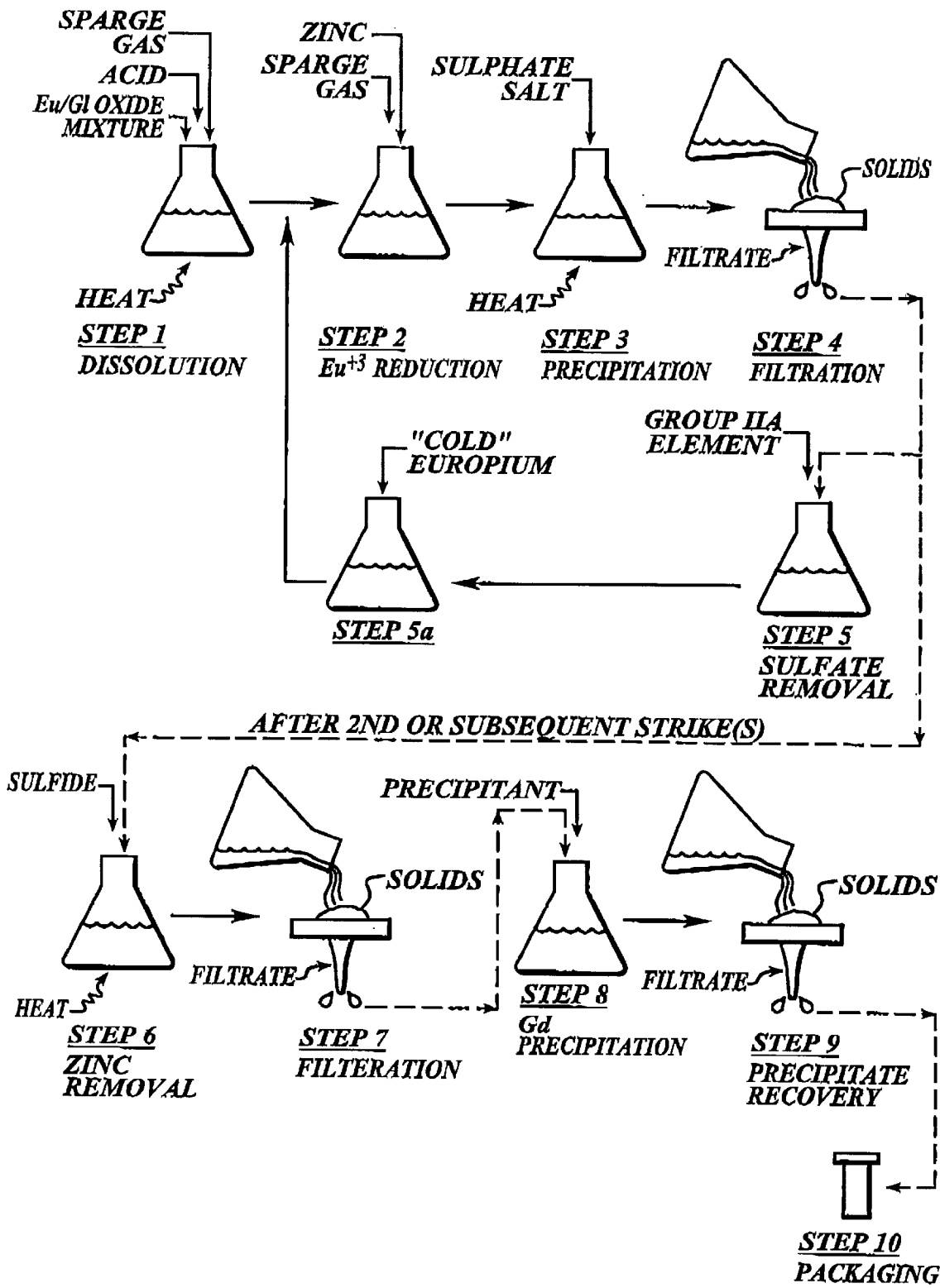

METHOD OF SEPARATING AND PURIFYING GADOLINIUM-153

This invention was made with Government support under Contract DE-AC0676RLO1830 awarded by the U.S. Department of Energy. The Government has certain rights in the invention.

FIELD OF THE INVENTION

The present invention is a method of separating and purifying gadolinium-153 from irradiated europium containing a mixture of at least gadolinium-153 and europium. More specifically, the present invention is a method for the dissolution, separation and purification of gadolinium-153 from an irradiated target of europium oxide ($Eu_2O_3$) containing isotopes of Eu, Sm and Gd.

As used herein, the term "chemically separating" or "chemically reducing" excludes the use of externally applied voltage to effect a change in valence.

BACKGROUND OF THE INVENTION

Gadolinium-153, with a half-life of 242 days, has been used in the early detection and tracking of osteoporosis. (Osteoporosis is a crippling brittle-bone disease that affects 20 million Americans, mostly women over the age of 45.) Presently it is used as a calibration source for single photon emission computerized tomography (SPECT) cameras. Curie amounts of $^{153}Gd$ have been produced in the High Flux Isotope Reactor (HFIR) at the Oak Ridge National Laboratory in Oak Ridge, Tenn; at the Fast Flux Test Facility (FFTF) at the DOE Hanford site in Richland, Wash.; and at the Argonne Test Reactor (ATR) at Idaho Falls, Id., by the nuclear reactions:

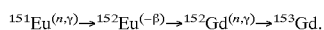

$$^{151}Eu^{(n,\gamma)} \rightarrow ^{152}Eu^{(-\beta)} \rightarrow ^{152}Gd^{(n,\gamma)} \rightarrow ^{153}Gd.$$

The isotopic composition of the irradiated Eu target varies with the nuclear reactor properties but is approximately as shown in Table 1.

TABLE 1

Composition of Irradiated Europium (FFTF Reactor)
(Basis: 1 g of target RE oxide at discharge)

| Isotope | Initial Final Mass(gm) | Activity Mass(gm) | (Ci) | Half-life, days |
|---|---|---|---|---|
| Eu-150 | — | 2.00E − 04 | 330 | 5.25E − 01 |
| Eu-151 | 0.47 | 2.88E − 01 | — | Stable |
| Eu-152 | — | 7.66E − 02 | 13.6 | 4.82E + 03 |
| Eu-152m | — | 1.00E − 04 | 220 | 3.88E − 01 |
| Eu-153 | 0.53 | 2.34E − 01 | — | Stable |
| Eu-154 | — | 1.99E − 01 | 53.8 | 3.12E + 03 |
| Eu-155 | — | 8.70E − 02 | 40.3 | 1.81E + 03 |
| Eu-156 | — | 7.20E − 03 | 397.4 | 1.51E + 01 |
| Sm-150 | — | 2.00E − 04 | — | Stable |
| Sm-151 | — | 1.00E − 06 | < | 3.18E + 04 |
| Sm-152 | — | 1.46E − 02 | — | Stable |
| Sm-153 | — | 2.00E − 04 | 86.7 | 1.96E + 00 |
| Sm-154 | — | 1.00E − 04 | — | Stable |
| Gd-151 | — | 1.00E − 05 | 0.07 | 1.20E + 02 |
| Gd-152 | — | 6.19E − 02 | < | 1.10E + 14 |
| Gd-153 | — | 1.90E − 03 | 6.67 | 2.42E + 2 |
| Gd-154 | — | 7.00E − 04 | — | Stable |
| Gd-155 | — | 2.00E − 03 | — | Stable |
| Gd-156 | — | 2.05E − 02 | — | Stable |

All of the samarium isotopes (Table 1) are either stable, generated in insignificant amounts, or have decayed to zero (i.e. Sm-153); and only Eu-152, Eu-154 and Eu-155 contribute to the gamma dose, if the targets are "cooled" for ~150 days before processing. If the Eu isotopes are 99.999% removed, no additional processing may be required.

Dissolution, separation and purification of Europium from other rare earths including gadolinium has been done as reported by McCoy (1935) and Yost (1946), in which dissolution was in sulfuric acid. Separation began with reducing the $Eu^{+3}$ to $Eu^{+2}$ with zinc either in the form of zinc dust or as an amalgamated (mercury coated) zinc column in the form of a Jones reductor, followed by precipitating the $Eu^{+2}$ fraction as $EuSO_4$ with the sulfate from the sulfuric acid. Dissolution and separation were in a non-oxidative environment of carbon dioxide ($CO_2$).

Marsh (1943) reported an improvement over McCoy by using a sodium amalgam. Marsh further recommended against the use of barium sulphate from which the recovery of europium is troublesome even though a barium amalgam resulted in precipitate including europium. He further recommends against the use of zinc dust for rendering bivalent sulfate precipitates unstable.

Ryabchikov (1970) reports that the more soluble rare earths dissolve in weak acids such as acetic, carbonic, and chromic.

More recently, the Oak Ridge National Laboratory has produced $^{153}Gd$ by the neutron irradiation of 5 to 10 g of $Eu_2O_3$. The resulting europium to gadolinium weight ratio after irradiation in the HFIR approaches 17 (Quinby 1987). To achieve 99.99% radiochemical purity of the $^{153}Gd$ product a two step process was used. First, the irradiated europium oxide was dissolved in 1 N sulfuric acid. Second, the solution was placed in an electrochemical cell where 90 to 95% of the energetic (gamma) Eu fraction was removed by electroreduction of Eu(III) to Eu(II) [using zinc electrodes]. Argon was used as a cover gas. High pressure ion exchange was then used to remove additional Eu(III) and sulfuric acid to obtain a gadolinium product of 99.9% purity. This process has the disadvantages of low production (7 g batches of Eu oxide), poor yields (~70%) of $^{153}Gd$, and the need for the high pressure ion exchange.

Also Wheelwright (1986) described a method to separate Eu on a large scale (~60 grams) from the Gd-Sm fraction prior to final purification. During the 'First Cycle of Chemical Purification' $Eu_2O_3$ targets were dissolved. When dissolution was complete, the Eu(III) was reduced to Eu(II). Further chemical purification by ion exchange was then required to separate the Gd from a trace of Eu and the Sm. This was accomplished by ion exchange band displacement (Wheelwright; 1969, 1973).

After separation of the major fraction of the Eu isotopes, to prevent irradiation damage to the organic ion exchange resin, Campbell (1973) and Elbanowski (1985) suggested the use of high-pressure ion exchange for final purification.

A solvent extraction process in which the Gd was extracted away from the Eu by use of di(2-ethylhexyl) phosphoric acid after the reduction of Eu to the divalent form was also investigated by Posey (1986).

However, there still remains a need in the art of gadolinium separation for a method having a higher production and yield.

BACKGROUND REFERENCES

Campbell, D. O. 1973. "Rapid Rare Earth Separation by Pressurized Ion Exchange Chromatography", *J. Inorg. Nucl. Chem.*, 35, pp. 3911–3919.

Elbanowski, M. and J. Baranowska. 1985. "Preparation of High-Purity Europium Oxide Using Combined Reduction-Ion Exchange Method", *Journal of Less-*

Common Metals, 112, pp. 267–270, Elsevier Sequoia/ Printed in the Netherlands.

Marsh, J. K., 1943. "Rare-earth Metal Amalgams. Part IV. The Isolation of Europium, J. Chem. Soc., No. 142. pp 531–535.

McCoy, H. N. 1935. "The Separation of Europium from Other Rare Earths", *Journal of American Chemical Society*, 57, p. 1756, New York, N.Y.

Posey, J. C. 1986. *Use of High-Pressure Ion Exchange for the Production of Gadolinium-153, Status Report,* ORNL/ TM-9988, Oak Ridge National Laboratory, Oak Ridge, Tenn.

Quinby, T. C., D. W. Ramey and M. Petek. 1987. *The Application of Electroreduction of Europium in the Production of Gadolinium-153,* ORNL/TM-10284, Oak Ridge National Laboratory, Oak Ridge, Tenn.

Ryabchikov, D. I., V. A. Ryabukhin, *Analytical Chemistry of Yttrium and the Lanthanide Elements,* 1970.

Yost, D. M. and R. M. Cooley. 1946. *Inorganic Synthesis,* 69, pp. 69–70, McGraw Hill, New York, N.Y.

Wheelwright, E. J. 1969. "A Comparison of Eluting Agents for the Ion-Exchange Purification of Promethium", *J. Inorg. Nucl. Chem.,* 31, pp. 3287–3293.

Wheelwright, E. J. 1973. "Recovery and Purification of Promethium", Chapter 2, *Promethium Technology,* ed. E. J. Wheelwright, American Nuclear Society, Hinsdale, Ill.

Wheelwright, E. J. 1986. *Production and Purification of Gadolinium-153 at Hanford,* PNL-SA-14410, presented at the Osteoporosis Seminar on Oct. 27, 1986 in Seattle, Wash., Pacific Northwest Laboratory, Richland, Wash.

SUMMARY OF THE INVENTION

The present invention is an improvement to the method of separating and purifying gadolinium from a mixture of gadolinium and europium having the steps of (1) dissolving the mixture in an acid; (2) reducing europium+3 to europium+2; (3) precipitating the europium+2 with a sulfate in a superstoichiometric amount; and (4) filtering the precipitated europium+2; wherein the improvement is achieved by using one or more of the following:

(i) the acid is a weak acid;

(ii) the reducing is with zinc metal in the absence of a second metal or with an amount of the second metal that is ineffective in the reducing;

(iii) adding a group IIA element after step (4) for precipitating the sulfate remaining prior to repeating steps (2) and (3);

(iv) the sulfate is a sulfate salt with a monovalent cation;

(v) adding cold europium+3 prior to repeating steps (2) and (3).

An advantage of the present invention is that the addition of non-radioactive europium is effective in any gadolinium purification/separation process. In other words, additional non-radioactive or "cold" europium reduces the amount of radioactive europium by isotopic dilution. An advantage of the gadolinium purification/separation process of the present invention is the elimination of an ion exchange step and yields of gadolinium greater than 90% with separation or removal of more than 99.9% of the europium.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a flow chart of process steps of the present invention.

DESCRIPTION OF THE PREFERRED EMBODIMENT(S)

The present invention is an improvement to the method of separating and purifying gadolinium from a mixture of gadolinium and europium having the steps of (a) dissolving the mixture in an acid; (b) reducing europium+3 to europium+2; and (c) precipitating the europium+2 with a sulfate; wherein the improvement is achieved by using one or more of the following:

(i) The acid is a weak acid including but not limited to anoic acid, carbonic acid, chromic acid, citric acid and combinations thereof. An anoic acid is herein defined as having the structure R—COOH with the properties of non-oxidizing, rare-earth dissolving, inert to zinc sulfide, and permissive of zinc reduction of europium. Anoic acids include but are not limited to methanoic acid or formic acid (HCOOH), ethanoic acid or acetic acid ($CH_3COOH$), ethandioic acid or oxalic acid (HOOCCOOH), butanoic acid or butyric acid ($C_3H_7COOH$), amino acid (R'—$CHNH_2COOH$) including but not limited to 2-aminoethanoic acid or glycine wherein R' is H. Chromic acid is less preferred because of the introduction of the additional metal (chrome). A weak acid has the advantage of not corroding the vessels and hardware used for handling the mixture, but is just as effective for dissolution as sulfuric or hydrochloric acids. Additionally, dissolved Zn may be later removed from solution using $H_2S$ gas or $Na_2S$ because ZnS is insoluble in certain weak acid whereas ZnS is soluble and not removable as a precipitate from other strong acids including HCl, $HNO_3$ and combinations thereof. Anoic acid, specifically acetic acid is preferred having succeeded in demonstration.

(ii) The reducing of Eu(III) to Eu(II) is with zinc metal in the absence of a second metal or with an amount of the second metal that is ineffective in the reducing. Avoiding the use of a second metal, for example sodium, mercury or amalgams thereof, especially mercury has clear advantages for operational health and safety as well as waste management. Mercury was used to prevent oxidation of the zinc. However, by removing an oxide layer from the zinc and promptly immersing the zinc into the anoic acid sufficient clean (non-oxidized) zinc was available for the reducing. Removal of the oxide layer may be accomplished with a strong acid, for example HCl.

(iii) Adding a group IIA element for precipitating the sulfate remaining permits repeat sulfate reduction(s), specifically repeat of steps (2), (3) and (4). Remaining sulfate ion ($SO_4^=$) must be removed prior to any repeat Eu(III) to Eu(II) reduction steps because sulfate ion interferes with zinc reduction. In other words, no Eu(III) to Eu(II) takes place if free sulfate ion is in the solution. The sulfate ion is removed by the addition of the group IIA element Be, Mg, Ca, Sr, Ba, Ra, preferably Ba, preferably in the form of the counter ion used to dissolve the initial material or target. When acetic acid is used for dissolution, use of the acetate counterion precludes addition of un-needed ions. Thus, barium acetate is preferred after the acetic acid dissolution to form $BaSO_4$. Filtration of the $BaSO_4$ formed precipitate, prior to the subsequent reduction(s) is not required.

(iv) The sulfate is a sulfate salt with a monovalent cation. Monovalent cation includes for example Li, Na, K, Rb, Cs, $NH_4$ and combinations thereof. Sulfate salt with a monovalent ion has the advantage of neither interfering with removal of Zn(II)S nor contaminating the Gd final product as was observed for use of divalent sulfate (e.g. $MgSO_4$). Although sulfuric acid is a sulfate with a monovalent cation (H), it is not a salt and is therefore excluded from the group of sulfate salt with a monovalent cation.

(v) Addition of cold (non-radioactive) europium+3 upon subsequent repetition(s) for further lowering the amount of the radioactive Eu by enhancing reduction with zinc.

As used herein, a "strike" is a series of steps to (1) reduce the Eu(III) to Eu(II) followed by (2) sulfate precipitation to separate the Gd/Sm from the Eu. The first strike contains the original radioactive Eu isotopes, removing >99% of the Eu. The 2nd and 3rd strikes, are completed to obtain a final Gd product with >99.999% of the radioactive Eu removed. "Cold" Eu acetate is added to the Gd/Sm acetate solution during the 2nd and 3rd strikes to effectively reduce the remaining radioactive Eu isotopes.

The final Gd-152 purified product can be recovered from the acid solution by precipitation using $Na_2CO_3$ to form $Gd_2(CO_3)_3$, or using oxalic acid to form $Gd_2(C_2O_4)_3$.

A preferred method includes all of the improvements described above. Specifically, the preferred method may be described in the following steps shown in FIG. 1:

Mixed Solution Preparation

Step 1

The irradiated Eu oxide powder or pellets having gadolinium are first removed from a container that may be a metal cladding, glass ampule(s) or combinations thereof. The Eu oxide is then dissolved in a weak acid making a mixed solution. In order to reduce dissolution time, it is preferred that the Eu oxide in the anoic acid be heated. Heating may range from just above room temperature to just below boiling, and is preferably at about 80° C. For example, using the preferred acetic acid,

$Eu_2O_3+Gd_2O_3+Sm_2O_3+CH_3COOH\rightarrow Eu(CH_2COOH)_3+Gd$ and Sm acetate+acetic acid The mixed solution is stirred and inert gas sparged with a non-oxidative gas, including but not limited to argon (Ar), nitrogen ($N_2$), carbon dioxide ($CO_2$) or combinations thereof, removing oxygen to below detectable limits from the mixed solution and from the head space above solution. Note that sparging may be done as part of step 2. Once sparged, the inert gas is maintained in all subsequent steps to prevent contact with oxygen.

1st Sulfate Strike to Remove >99% of the Eu

Step 2

The reduction of Eu(III) takes place by the addition of zinc (Zn) metal to promote reduction of Eu(III) to Eu(II). The zinc metal may be in any form, but high surface area forms are preferred including but not limited to sponge, porous frit, shredded, wool-like, granular and combinations thereof. For granular zinc, a size of from about 10 to about 20 mesh is preferred. The granules may be deployed into the mixed solution either in a mesh basket or as a slurry.

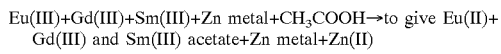
$Eu(III)+Gd(III)+Sm(III)+Zn$ metal+$CH_3COOH\rightarrow$ to give $Eu(II)+Gd(III)$ and Sm(III) acetate+Zn metal+Zn(II)

The zinc metal may be added directly. However, the presence of an oxide layer on the zinc metal may impede or delay the reduction of the europium. Although the acid may penetrate the oxide layer to the unoxidized metal below, it is preferred to initially wash the zinc metal with an acid to remove the oxide layer and expose the unoxidized metal prior to addition. Any acid may be used, but hydrochloric acid is preferred.

Step 3

A soluble sulfate salt with a monovalent cation, preferably lithium sulfate, is then added as a solution to precipitate the divalent Eu ion in solution, $EuSO_4$. In order to maximize Eu precipitation, it is preferred that the amount of monovalent sulfate be a superstoichiometric amount needed for the precipitation. An amount of about 105% of the stoichiometric amount of sulfate salt is preferred. Since the Eu sulfate precipitate has a retrograde solubility the solution is preferably heated to encourage the stability of the precipitate. Heating may be from just above room temperature to a thermal degradation limit of the solution, but is preferably from about 80° C. to about boiling of the solution.

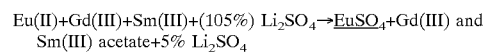
$Eu(II)+Gd(III)+Sm(III)+(105\%)\ Li_2SO_4\rightarrow \underline{EuSO_4}+Gd(III)$ and Sm(III) acetate+5% $Li_2SO_4$ Step 4

The solid $EuSO_4$ containing ~99.9% of the radioactive Eu isotopes and undissolved zinc (if in slurry form) is filtered away from the Gd/Sm acetate solution, leaving the Gd/Sm acetate solution.

Preparation for Subsequent Strike(s)

Step 5

To prepare for subsequent strike(s) (repeat(s) of steps 2, 3, and 4), the excess $SO_4^=$ ion remaining in the Gd/Sm acetate solution of the previous strike is precipitated as $RSO_4$ by the addition of R, a group IIA element, preferably barium and preferably as barium acetate to make a sulfate free Gd/Sm acetate solution.

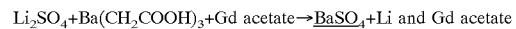
$Li_2SO_4+Ba(CH_2COOH)_3+Gd$ acetate$\rightarrow \underline{BaSO_4}+Li$ and Gd acetate Precipitation of the sulfate permits further reduction of Eu(III).

Step 5a

"Cold" Eu acetate is added to the sulfate free Gd/Sm acetate solution to aid in carrying the radioactive Eu isotopes. (Note that step 5a and step 2 are combinable and interchangeable after the first strike.)

Second Strike

Repeat Steps 2–4.

Third and Subsequent Strike(s)

Repeat Steps 5, 5a, and 2–4.

Achieving removal of Eu isotopes from ~99.9% to >99.999% Eu leaving a purified Gd acetate solution, at least two strikes are required.

Finishing

Removal of Zinc

Step 6

Dissolved Zinc(II) is removed from the purified Gd acetate solution by sulfide precipitation. Sulfide precipitation is preferred because zinc sulfide (ZnS) is insoluble in a weak acid. Sulfur precipitation may be accomplished with $H_2S$ gas sparging, dissolved $Na_2S$ addition and combinations thereof. In order to promote precipitation, heating is preferred. Heating may range from just above room temperature to a thermal breakdown limit of the solution, but heating to about 80° C. is preferred. For example:

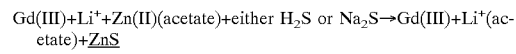
$Gd(III)+Li^++Zn(II)(acetate)+$either $H_2S$ or $Na_2S\rightarrow Gd(III)+Li^+(acetate)+\underline{ZnS}$ Step 7

Purified Gd acetate solution is filtered to remove $\underline{ZnS}$ (underlining denotes precipitate).

Gadolinium Recovery

Step 8

The Gd is recovered by precipitation. A precipitant is added. The precipitant may be sodium carbonate, oxalic acid or a combination thereof. Because gadolinium carbonate solubility is pH sensitive, it is preferred that the pH of the solution upon addition of sodium carbonate be within a range wherein the gadolinium carbonate is substantially insoluble. Thus, for sodium carbonate, it is preferred that the pH be from about 4 to about 8, preferably about 7.

$$Gd(III) + Li^+(acetate) + Na_2CO_3 \rightarrow \underline{Gd_2(CO_3)_3} + Na_2C_2H_3O_2$$

Step 9

The solution is filtered to recover the Gd precipitate.

Product Packaging

Step 10

The gadolinium precipitate may then be packaged for shipping. Preferred forms are gadolinium chloride or gadolinium oxide.

Gadolinium chloride may be obtained by acid dissolution in hydrochloric acid, $$Gd_2(CO_3)_3 + HCl \rightarrow GdCl_3 + CO_2$$

The acid dissolution gadolinium product may then be analyzed and evaporated to dryness in a shipping vial. Use of nitric acid results in gadolinium nitrate that may also be used.

Gadolinium oxide may be obtained from a carbonate or oxalate form of the gadolinium, usually by heating. The gadolinium oxide may then be analyzed by sampling the oxide and acid dissolution.

The final Gd-153 product is packaged in a shipping vial for shipment to the customer.

EXAMPLE 1

An experiment was conducted using "cold" (non-radioactive) europium to demonstrate the preferred method of the present invention for a first strike separating Eu(II) sulfate from Gd(III) dissolved in an acetic acid solution.

Equipment: Stirring hot plate, Teflon coated magnetic stir bar, acetic acid (17.4M), zinc metal (20 mesh), argon supply, sparge tube, HCl, 1M $Li_2SO_4$, thermometer.

Conditions: 1M acetic acid, 0.1M Eu, 0.01M Gd, (9 g $Eu_2O_3$ and 0.91 g $Gd_2O_3$). 36 g Zn. 0.12 moles of $Li_2SO_4$ (140% excess).

1. Weigh out 9 g $Eu_2O_3$ (0.051 moles). 8.9745 g
2. Weigh out 0.91 g $Gd_2O_3$ (0.005 moles). 0.9114 g
   Items 1. and 2. simulate an irradiated mixture of $Eu_2O_3$ containing gadolinium.
3. Dissolve in 500 mL of 1M acetic acid or 28.7 mL of 17.4M $CH_3COOH$/500 mL.
4. Heat the solution to 80° C. with stirring and Argon sparging to dissolve rare earth oxides. Sparge for 60 minutes.
5. Sample Feed.
6. Weigh out 36 g zinc (72 g/L).
6a. (optional) Wash in 100 mL of 2M HCl (16.7 mL 12M HCl). Wash twice with distilled water to remove HCl.
7. Add zinc and sparge solution for 60 minutes.
8. Add 120 mL of 1M $Li_2SO_4$-pre sparged and heated to 80° C.
9. Results, Table E1-1

TABLE E1-1

First Strike Gadolinium Recovery Results

| | mg/liter | | | | % in Solution | |
|---|---|---|---|---|---|---|
| Time | Eu | Gd | Zn | Vol, mL | Eu | Gd |
| Feed | 13,200 | 1,460 | <6.8 | 500 | — | — |
| 0 time | 14,000 | 1,570 | 4,600 | 600 | 106 | 107.5 |
| 15 min | 26 | 1,200 | 4,060 | 600 | 0.24 | 98.6 |
| 30 min | 28 | 1,390 | 4,790 | 600 | 0.21 | 114.2 |
| 60 min | 18 | 1,200 | 4,490 | ~594 | 0.16 | 99.3 |
| 2 hrs | 31 | 1,290 | 5,360 | ~584 | 0.27 | 103.2 |
| 4 hrs | 20 | 1,260 | 6,150 | ~568 | 0.17 | 98.0 |
| ~9 hrs | 16 | 1,230 | 7,470 | 540 | 0.13 | 91.0 |

10. Conclusion: 99.87% Eu removal, >91% Gd recovery, >4 g Zn dissolved.

EXAMPLE 2

An experiment was conducted to demonstrate a first strike followed by a second strike with and without additional "cold" Eu, using excess sulfate from 1st strike.

The equipment and conditions were as in Example 1 except that 2M acetic acid was used for the dissolved feed. $1^{st}$ Strike, followed by $2^{nd}$ strike with Eu using excess sulfate from $1^{st}$ strike.

1. Weigh out 9 g $Eu_2O_3$ (0.0509 moles). 8.9608 g
2. Weigh out 0.91 g $Gd_2O_3$ (0.005 moles). 0.9207 g
3. Dissolve in 500 mL of 2M acetic acid or 57.4 mL of 17.4M $CH_3COOH$/500 mL.
4. Heat the solution to 80° C. with stirring and Argon sparging to dissolve rare earths. Sparge for 60 minutes.
5. Sample Feed (Sample 3-0)
6. Weigh out 36 g zinc.
6a. (optional) Wash in 100 mL of 2M HCl. Wash twice with distilled water to remove HCl.
7. Add zinc and sparge solution for 90 minutes.
8. Add 100 mL of $Li_2SO_4$, 13.4948 g and heated to 80° C.
9. Results Table E2-1

TABLE E2-1

Gadolinium Recovery with a Second Strike

| | mg/liter | | | | % in Solution | |
|---|---|---|---|---|---|---|
| Time | Eu | Gd | Zn | Vol, mL | Eu | Gd |
| Feed (3-0) | 12,500 | 1,290 | <9 | 500 | — | — |
| 0 time | 12,400 | 1,290 | 4,830 | 600 | 106 | 107.5 |
| 15 min | 80 | 1,100 | 4,440 | 585 | 0.63 | 99.8 |
| 30 min | 66 | 1,110 | 4,670 | 573 | 0.51 | 98.6 |
| 60 min | 34 | 1,120 | 4,890 | ~555 | 0.25 | 96.4 |
| Filtrate (3-10) | 33 | 1,150 | 5,280 | 600 | 0.27 | 107.0 |

10. Conclusion: 99.75% Eu removal, >96.4% Gd recovery, 5.2 g Zn/L dissolved.

2nd Strike, No Sulfate Removal, No Additional Eu

2nd strike, no additional "cold" Eu, containing excess sulfate from 1st strike.

11. Divide the filtrate (3-10) into two 300 mL portions, 3-10A and 3-10B.
12. Weigh out 17.9995 g zinc.
12a. (optional) Wash zinc in 50 mL of 2M HCl (8.3 mL 12M HCl). Wash zinc twice with distilled water to remove HCl.

13. Heat the 300 mL of solution A to 80° C. with stirring and Argon sparging. Sparge for 30 minutes.
14. Add zinc and sparge portion 3-10A (300 mL) for 60 minutes.
15. Filter, cool, determine final volume 295 mL.
18. Adjust to 300 mL if needed with water, stir.
19. Sample (3-21).
20. Results Table E2-2

TABLE E2-2

Gadolinium Recovery, No Eu, No Sulfate Removed

| | mg/liter | | | | % in Solution | |
|---|---|---|---|---|---|---|
| Time | Eu | Gd | Zn | Vol, mL | Eu | Gd |
| Portion (3-10A) | 33 | 1,150 | 5,280 | 300 | 0.27 | 107.0 |
| Final(3-21) | 6.7 | 1,160 | 10,600 | 300 | 0.064 | ~100 |

Conclusion: 99.75% Eu removal to 99.94% Eu, >96.4% Gd recovery, 10.6 g Zn/L. Slight improvement in Eu decontamination factor (DF).

2nd Strike Using Eu, No Excess Sulfate Removed

2nd strike, additional "cold" Eu added, containing excess sulfate from 1st strike)

21. Weigh out 1 g $Eu_2O_3$ (0.0028 moles), 1.0358 g.
22. Dissolve in 25 mL of 2M acetic acid (3 mL of 17.4M $CH_3COOH$/25 mL).
23. Mix the 300 ml of portion (3-10B) with the 25 mL of Eu acetate, stir.
24. Sample the 325 mL, B Feed.
25. Heat the 325 mL of B Feed to 80° C. with Ar sparging, 30 minutes.
26. Weigh out 18.0399 g Zn. Wash in 50 mL of 2M HCl (8.3 mL 12M HCl). Wash twice with distilled water to remove HCl.
27. Add zinc and sparge solution for 60 minutes.

Conclusion: No Eu(III) to Eu(II) reduction or sulfate precipitation was observed, i.e., the $SO_4^=$ (107% in excess of that needed to complete 1st sulfate strike) was passivating the zinc metal surface.

EXAMPLE 3

An experiment was conducted by performing a 1st Strike, followed by removing excess sulfate from 1st strike by using barium acetate, followed by 2nd Strike with and without Eu addition.

The equipment was the same as in Example 1 except for the addition of $Ba(C_2H_3O_2)_2$.

The conditions were the same as in Example 2 except the use of 0.056 moles of $Li_2SO_4$ (9.5% excess).

1. Weigh out 9 g $Eu_2O_3$ (0.0512 moles). 9.0123 g
2. Weigh out 0.91 g $Gd_2O_3$ (0.005 moles). 0.9125 g
3. Dissolve in 500 mL 2M acetic acid or 57.4 mL of 17.4M $CH_3COOH$/500 mL.
4. Heat the solution to 80° C. with stirring and Argon sparging to dissolve rare earth oxides. Sparge for 60 minutes.
5. Sample Feed (4-3).
6. Weigh out 36 g zinc. Wash in 100 mL of 2M HCl. Wash twice with distilled water to remove HCl.
7. Add zinc and sparge solution for 90 minutes. Solution yellow.
8. Add 100 mL of $Li_2SO_4$, 7.1735 g (0.05606 moles)—heated to 80° C.
9. Results Table E3-1

TABLE E3-1

Gadolinium Recovery, First Strike

| | | mg/liter | | | | % in Solution | |
|---|---|---|---|---|---|---|---|
| Time | Sample | Eu | Gd | Zn | Vol, mL | Eu | Gd |
| Feed | (4-3) | 13,200 | 1,350 | <1 | 500 | — | — |
| 5 min | (4-4) | 42 | 1,120 | 8,200 | 600 | 0.38 | 99.6 |
| 15 min | (4-5) | 38 | 1,150 | 8,650 | ~590 | 0.34 | 100.5 |
| 30 min | (4-6) | 27 | 1,170 | 9,600 | ~580 | 0.24 | 100.5 |
| 60 min | (4-7) | 18 | 1,150 | 10,800 | ~560 | 0.15 | 95.4 |
| Filtrate | (4-8) | 29 | 1,230 | 11,600 | 600 | 0.26 | 109.3 |

Conclusion: 99.85% Eu removal, >95.4% Gd recovery, 11.6 g Zn/L dissolved during first strike.

Removal of Excess Sulfate using Ba Acetate

Remove excess sulfate ion from 1st strike filtrate (4-8).

10. 1st strike filtrate=0.05606−0.0512=0.00535 moles $SO_4^=$.
11. Add 1.3779 g $Ba(C_2H_3O_2)_2$=0.00537 moles of Ba(II) to 600 mL of 1st strike filtrate, 80° C. and stir for 60 min.
12. Filtrate still showed signs of $SO_4^=$, therefore added an additional 1.3733 g $Ba(C_2H_3O_2)_2$.
13. Filtered $BaSO_4$ from solution and sampled (4-13).
14. Results Table E3-2

TABLE E3-2

Sulfate Removal Prior to Second Strike, No Eu

| | mg/liter | | | | | | Vol, |
|---|---|---|---|---|---|---|---|
| Time | Eu | Gd | Zn | Ba | Li | S | mL |
| Feed (4-8) | 29 | 1,230 | 11,600 | < | 1420 | 470 | 600 |
| Filtrate (4-13) | (21) | 1,090 | 9,960 | 560 | 1220 | <0.3 | 620 |
| % Change | 74.8 | 91.6 | 88.7 | ~100 | 88.9 | ~100 | |

Conclusion: Excellent sulfate ion removal, poor material balance shown by Eu, Gd, Zn and Li.

2nd Strike with Sulfate Removed-with and without additional Eu

2nd strike, no additional "cold" Eu, containing No sulfate from 1st strike).

15. Divide (4-13) (above) into two 310 mL portions, 4-13A and 4-13B.
16. Weigh out 18 g zinc. Wash in 50 mL of 2M HCl (8.3 mL 12M HCl). Wash twice with distilled water to remove HCl.
17. Heat the 310 mL of solution 4-13A to 80° C. with stirring and Argon sparging. Sparge for 15 minutes.
18. Add zinc and sparge 4-13A (310 mL) for 90 minutes.
19. Add 1.7606 g $Li_2SO_4$ and sample after 60 min.
20. Filter, cool, determine final volume 365 mL (4-17.
21. Results Table E3-3

TABLE E3-3

Gadolinium Recovery After Second Strike Without Sulfate, No Eu

| Time | Eu | Gd | Zn | Ba | Li | S | Vol, mL |
|---|---|---|---|---|---|---|---|
| | | | mg/liter | | | | |
| Feed (4-3) | 13,200 | 1,350 | <1 | — | | 140 | 7.1 250 |
| (4-13) | (21) | 1,090 | 9,960 | 560 | 1220 | 0.3 | 310 |
| 60 min (4-17) | 4.7 | 1,140 | 13,700 | 0.65 | 1870 | 1440 | 365 |
| % in Solution | 0.051 | 123.8 | | | | | |

Conclusion: 99.95% Eu removal compared to 99.85 on 1st strike, ~100% Gd recovery, 13.7 g Zn/L. Slight improvement in Eu DF.

2nd strike, additional "cold" Eu added, containing No excess sulfate from 1st strike 22. Weigh out 1 g $Eu_2O_3$ (0.0057 moles), 1.0021 g.
23. Dissolve in 25 mL of 2M acetic acid (3 mL of 17.4M $CH_3COOH$/25 mL).
24. Mix the 310 ml of 4-13B with the 25 mL of Eu acetate, stir.
25. Heat the 328 mL of 4-13B to 86° C. with Ar sparging, 35 minutes.
26. Weigh out 18.0878 g Zn. Wash in 50 mL of 2M HCl (8.3 mL 12M HCl). Wash twice with distilled water to remove HCl.
27. Add zinc and sparge solution for 90 minutes.
28. Sample the 328 mL of B supernatant (4-19A).
29. Add 1.7589 g $Li_2SO_4$ (240% of sulfate required).
30. Sample the supernate after 60 minutes (4-22).
31. Results Table E3-4

TABLE E3-4

Gadolinium Recovery Without Sulfate and With Eu

| Time | Eu | Gd | Zn | Ba | Li | S | Vol, mL |
|---|---|---|---|---|---|---|---|
| | | | mg/liter | | | | |
| Feed | | | | | | | |
| Feed (4-19A) | 2,250 | 990 | 12,000 | 510 | 1160 | 0.4 | 328 |
| 60 min (4-22) | 14 | 900 | 12,500 | 1.4 | 1530 | 680 | 350 |
| % in Solution | 0.66 | 97.0 | | | | | |

Conclusion: The 1st strike removed 99.85% Eu (0.15% remained). With the addition of 1 g Eu, the second strike removed 99.34% of the 0.15% plus the added Eu. The overall removal of the original Eu is ~99.999%. Approximately 97% Gd was recovered. The final solution contained 12.5 g Zn/L.

EXAMPLE 4

An experiment was conducted to demonstrate zinc removal according to the present invention.

$Na_2S$ Zinc Removal

Take the effluent from (3-21, Table E2-2) and remove the zinc using $Na_2S$.

1. Place 150 mL of (3-21) in a flask and heat to 80° C.
2. Add 13.55 g $Na_2S9H_2O$ to 50 mL of $H_2O$.
3. Add to 3-21 with stirring. Sample filtrate, 3-22.
4. Add 6.777 g $Na_2S$ in 25 mL of $H_2O$ with stirring, Sample filtrate, 3-23.
5. Add 3.21 g $Na_2S$ in 25 mL of $H_2O$ with stirring, Sample filtrate, 3-24.
6. Results Table E4-1

TABLE E4-1

Zinc Removal With Sodium Sulfide

| Time | Eu | Gd | Zn | Li | S | Vol, mL |
|---|---|---|---|---|---|---|
| | | | mg/liter | | | |
| Feed | | | | | | |
| (3-21) | 5.9 | 1,120 | 10,000 | 2,250 | 2,870 | 150 |
| (3-22) | 4.3 | 870 | 0.3 | 1,770 | 4,111 | ~200 (190) |
| (3-23) | 3.9 | 770 | (0.05) | 1,570 | 4,520 | ~225 (215) |
| (3-24) | 3.7 | 720 | 0.7 | 1,450 | 4,380 | ~250 (233) |
| (3-25) | 3.9 (99.0%) | 640 (0.003%) | 0.3 | 1,300 | 4,900 | ~275 (260) |

Conclusion: Excellent removal of Zn (0.003% remained in solution). Good recovery of Gd (99%).

()=volume based on Li results.

$H_2S$ Gas Zinc Removal

Take the effluent from (3-21, Table E2-2) and remove the zinc using $H_2S$ gas.

1. Place 75 mL of (3-21) in a gas bubbler at 25° C.
2. Initiated ~1 psi gas flow through solution for 15 min.
3. Sampled and filtered (3-31).
4. Checked filtered sample by adding excess $Na_2S$. Sample precipitated.
5. Sparged main sample for an additional 15 min, sampled, filtered (3-32) and again checked using excess $Na_2S$. Sample again precipitated.
6. Place 65 mL of (3-21) in a gas bubbler at 80° C.
7. Initiated ~1 psi gas flow through solution for 15 min.
8. Sampled and filtered (3-33).
9. Sparged main sample for an additional 15 min, sampled, filtered (3-34) and again checked using excess $Na_2S$. Sample again precipitated. However, with a large excess of $Na_2S$ the precipitate dissolved as a yellow solution.
10. Sample solids for identification (3-35). Solids did not dissolve in dilute $HNO_3$, 3M HCl, ~4M acetic acid, but did dissolve in excess $Na_2S$ solution.
11. Results Table E4-2

TABLE E4-2

Zinc Removal With Hydrogen Sulfide Gas

| Time | Eu | Gd | Zn | Li | S | Vol, mL |
|---|---|---|---|---|---|---|
| | | | mg/liter | | | |
| Feed | | | | | | |
| (3-21) | 5.9 | 1,120 | 10,000 | 2,250 | 2,870 | 150 |
| (3-31)25° C. | 6.4 | 1,200 | 0.12 | 2,500 | 2,830 | ~150 |
| (3-32) | 6.4 | 1,200 | <0.05 | 2,480 | 2,870 | ~150 |
| (3-33)80° C. | 6.8 | 1,260 | 0.38 | 2,600 | 2,960 | ~150 |
| (3-34) | 6.5 (~100%) | 1,240 (0.003%) | 0.3 | 2,410 | 2,940 | ~150 |
| (3-35) Solids | <4 | <8 | <4 | <3 | 16,400 | |

Conclusion: Excellent removal of Zn (0.003% remained in solution). No loss of Gd (~100%). ZnS solids, formed at elevated temperature, improved the settling rate. Excess addition of S⁻ resulted in a precipitate containing sulfur only (3-35 dissolved solids).

EXAMPLE 5

An experiment was conducted to demonstrate Gadolinium Recovery Step Using Carbonate Precipitation according to the present invention.

Take the effluent from (3-25, Table E4-1) and recover the Gd Product using $Na_2CO_3$. Test at 80° C. and at 25° C. Dissolve final carbonate product sample.

1. Place 51 mL of (3-25), pH 6.28, in a flask, resample (3-26).
2. Added excess $Na_2CO_3$, 2.8212 g. Solution brought back to final pH=7.07 with acetic acid.
3. Sample filtrate, 3-27, (cold).
4. Place 52 mL of (3-26), pH 6.12, in a flask, 65° C.
5. Added excess $Na_2CO_3$ to a pH of 9.28. Solution brought back to final pH=7.1 with acetic acid.
6. Sample filtrate, 3-28, (hot). 3-28B (cold).
7. Dissolve samples in HCl and sampled, 3-29(cold), 3-30(hot).
8. Results Table E5-1

TABLE E5-1

Gadolinium Recovery With Sodium Carbonate

| | mg/liter | | | | | |
|---|---|---|---|---|---|---|
| Time | Eu | Gd | Zn | Li | S | Vol, mL |
| Feed | | | | | | |
| (3-26) | 7.2 | 610 | 0.5 | 1,230 | 4,310 | 51 |
| (3-27) | 0.4 | 33 | (0.1) | 1,180 | 4,040 | 53 |
| (3-28A) | <0.1 | 2.7 | 0.4 | 1,350 | 4,630 | 46.5 |
| (3-28B) | (0.05) | 6.6 | 0.3 | 1,330 | 4,700 | 46.5 |
| (3-29) (Cold) | 13 (86%) | 1,070 (0.003%) | 0.6 | 15 | 62 | 25 |
| (3-30) (Hot) | 14 | 1,160 (93.2%) | 0.8 | 23 | 75 | 25 |

Conclusion: Excellent removal of Gd (>93%) using $Na_2CO_2$, pH ~7.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of chemically separating and purifying gadolinium from a mixture of gadolinium and radioactive europium having the steps of (1) dissolving the mixture in an acid; (2) reducing europium+3 to europium+2; (3) precipitating the europium+2 with a sulfate; and (4) filtering the precipitated europium+2 from said mixture to produce a purified gadolinium solution; wherein the improvement comprises:

dissolving the mixture in a weak acid; and
   reducing europium+3 to europium+2 with zinc metal in the absence of a second metal or with an amount of the second metal that is ineffective in the reducing.

2. The method as recited in claim 1, wherein a further improvement comprises:

adding a group IIA element to a filtrate resulting from filtering the precipitated europium+2, for precipitating an excess of the sulfate.

3. The method as recited in claim 2, wherein said group IIA element is selected from the group consisting of Be, Mg, Ca, Sr, Ba, Ra, and combinations thereof.

4. The method as recited in claim 1, wherein the sulfate is a sulfate salt of a monovalent cation.

5. The method as recited in claim 4, wherein said monovalent cation is selected from the group consisting of Li, Na, K, Rb, Cs, $NH_4$ and combinations thereof.

6. The method as recited in claim 1, wherein said zinc metal is cleaned of zinc oxide.

7. The method as recited in claim 6, wherein said cleaning is with an acid.

8. A method of chemically separating and purifying gadolinium from a mixture of gadolinium and radioactive europium having the steps of (1) dissolving the mixture in an acid; (2) reducing europium+3 to europium+2; (3) precipitating the europium+2 with a sulfate and (4) filtering the precipitated europium+2 from said mixture to produce a purified gadolinium solution; wherein the improvement comprises:

adding a group IIA element to a filtrate resulting from filtering the precipitated europium+2; and,
   then adding non-radioactive europium to said filtrate thereby increasing removal of the radioactive europium.

9. The method as recited in claim 8, wherein said reducing is selected from the group consisting of electrochemically reducing, chemically reducing and combinations thereof.

10. The method as recited in claim 9, wherein said chemically separating is with a chemical separator selected from the group consisting of zinc metal, amalgamated mercury/zinc and combinations thereof.

11. A method of chemically separating and purifying gadolinium to a purity greater than 99.9% from a mixture of gadolinium and radioactive europium having the steps of (1) dissolving the mixture in an acid; (2) reducing europium+3 to europium+2; (3) precipitating the europium+2 with a sulfate; (4) filtering the precipitated europium+2 from said mixture to produce a purified gadolinium solution; and (5) repeating the steps (2), (3) and (4), wherein the improvement comprises:

adding a radioactive europium removal enhancer selected from the group consisting of a group IIA element, non-radioactive europium and combinations thereof to a filtrate resulting from filtering the precipitated europium+2, after step (4) and before step (3).

12. The method as recited in claim 11, wherein the acid is a weak acid and is selected from the group consisting of anoic acid, carbonic acid, chromic acid, citric acid and combinations thereof.

13. The method as recited in claim 12, wherein said anoic acid is selected from the group consisting of formic acid (HCOOH), acetic acid ($CH_3OOH$), oxalic acid (HOOCCOOH), butyric acid ($C_3H_7COOH$), amino acid (R'—CHNH2COOH) and combinations thereof.

14. The method as recited in claim 13, wherein said amino acid is 2-aminoethanoic acid or glycine.

15. The method as recited in claim 11, wherein said reducing is zinc metal reduction of the europium+3 to the europium+2, further comprising the step of removing said zinc metal by sulfide precipitation.

16. The method as recited in claim 15, wherein said sulfide precipitation is with hydrogen sulfide.

17. The method as recited in claim 15, wherein said sulfide precipitation is with sodium sulfide.

18. A method of chemically separating and purifying gadolinium to a purity greater than 99.9% from a mixture of gadolinium and radioactive europium having the steps of (1) dissolving the mixture in an acid; (2) chemically reducing europium+3 to europium+2; (3) precipitating the europium+2 with sulfate; and (4) filtering the precipitated europium+2 from said mixture to produce a purified gadolinium solution; and (4a) repeating steps (2), (3) and (4), wherein the improvement comprises:

(i) chemical reducing europium+3 to europium+2 with a zinc metal in the absence of a second metal or with an amount of the second metal that is ineffective in the reducing;

(ii) said sulfate is a sulfate salt of a monovalent cation; and (iii) adding a radioactive europium removal enhancer selected from the group consisting of group IIA element, non-radioactive europium and combinations thereof to a filtrate resulting from filtering the precipitated europium+2 after step (4) and before step (3);

(iv) after a final repeat of step (4a), removing said zinc metal with a sulfide precipitant selected from the group consisting of hydrogen sulfide, sodium sulfide and combinations thereof.

19. The method as recited in claim 18, wherein said acid is a weak acid and is selected from the group consisting of anoic acid, carbonic acid, chromic acid, citric acid and combinations thereof.

20. The method as recited in claim 19, wherein said anoic acid is selected from the group consisting of formic acid (HCOOH), acetic acid (CHOOH), oxalic acid (HOOCCOOH), butyric acid ($C_3H_7COOH$), amino acid (R'—CHNH2COOH) and combinations thereof.

21. The method as recited in claim 20, wherein said amino acid is 2-aminoethanoic acid or glycine.

22. The method as recited in claim 18, wherein said monovalent cation is selected from the group consisting of Li, Na, K, Rb, Cs, $NH_4$ and combinations thereof.

23. The method as recited in claim 18, wherein said group IIA element is selected from the group consisting of Be, Mg, Ca, Sr, Ba, Ra, and combinations thereof.

* * * * *